(12) United States Patent
Numata

(10) Patent No.: US 6,449,231 B1
(45) Date of Patent: Sep. 10, 2002

(54) STORAGE UNIT, OPTICAL RECORDING MEDIUM AND INFORMATION RECORDING METHOD

(75) Inventor: Takehiko Numata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/232,927

(22) Filed: Jan. 19, 1999

(30) Foreign Application Priority Data

Jan. 30, 1998 (JP) .......................................... 10-019646
Jan. 13, 1999 (JP) .......................................... 11-006008

(51) Int. Cl.$^7$ ................................................ G11B 7/00
(52) U.S. Cl. .................................... 369/53.2; 369/275.3
(58) Field of Search .............................. 369/58, 47, 48, 369/32, 275.3, 54, 53.2, 53.37, 53.41, 53.44, 53.45, 47.23, 47.26, 275.4

(56) References Cited

U.S. PATENT DOCUMENTS

| | | |
|---|---|---|
| 5,210,733 A | 5/1993 | Yamaguchi et al. |
| 5,371,722 A | 12/1994 | Yoshimura et al. |
| 5,568,467 A | 10/1996 | Inagaki et al. ............ 369/275.3 |
| 5,579,294 A | 11/1996 | Ohta et al. ..................... 369/58 |
| 5,835,479 A * | 11/1998 | Miyagawa et al. ......... 369/275.3 |

FOREIGN PATENT DOCUMENTS

| | | |
|---|---|---|
| EP | 571986 | 12/1983 |
| JP | 63-127468 | 5/1988 |
| JP | 63-160040 | 7/1988 |
| JP | 4-259941 | 9/1992 |
| JP | 7-182705 | 7/1995 |
| JP | 8249753 | 9/1996 |
| JP | 8-249753 | 9/1996 |

\* cited by examiner

Primary Examiner—Thang V. Tran
(74) Attorney, Agent, or Firm—Greer, Burns & Crain, Ltd.

(57) ABSTRACT

A storage unit optically reproduces information from an optical recording medium of a type having a control region which is prerecorded with control information with an embossed shape and a data region in which data is recorded optically. The control information includes medium information peculiar to the recording medium, and the control region and the data region have mutually different recording densities. The storage unit is provided with a control device for switching a frequency of a read clock which is used when reproducing the control information and the data from the optical recording medium between a case where the control information is reproduced and a case where the data is reproduced.

14 Claims, 12 Drawing Sheets

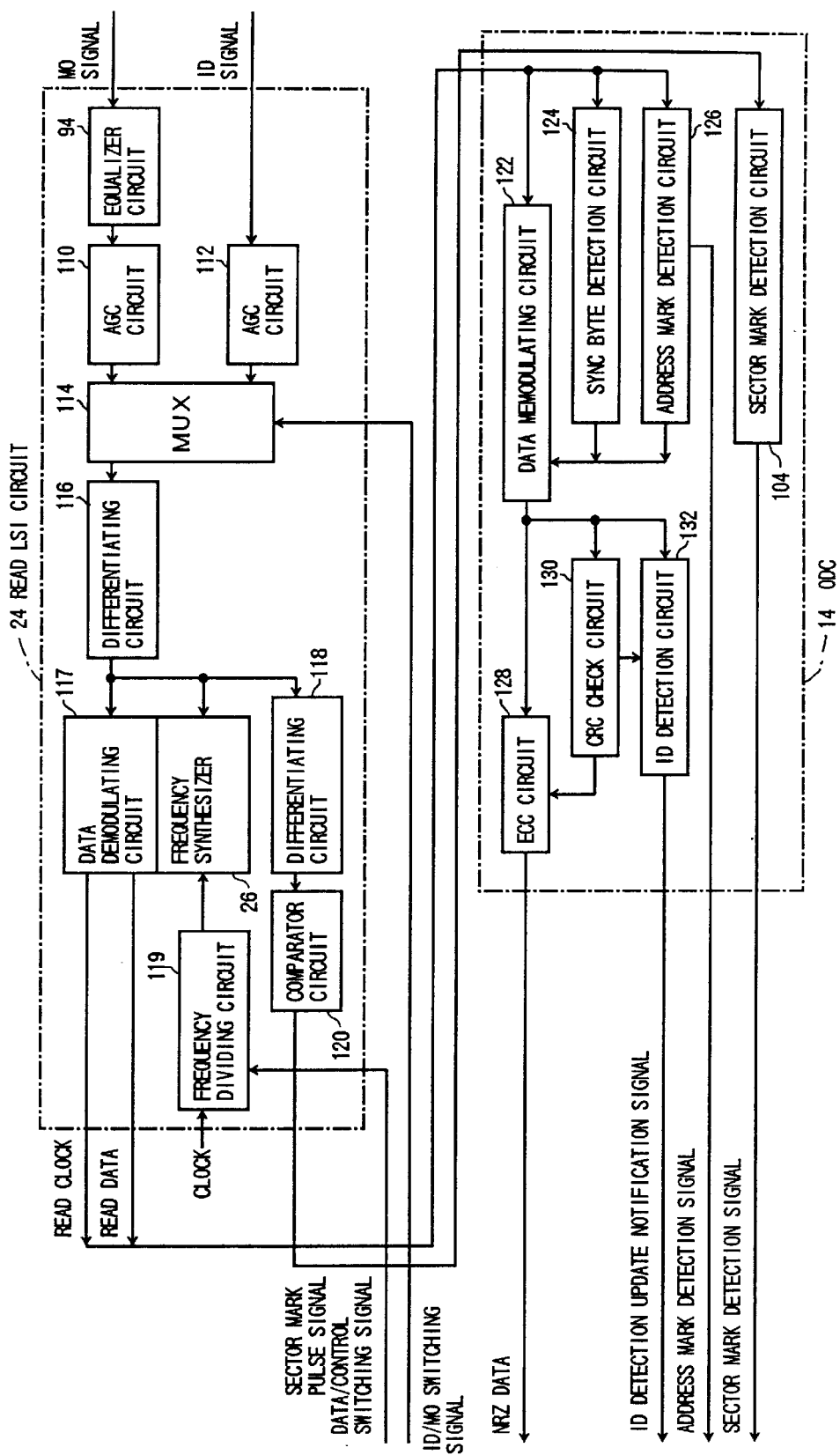
F I G. 5

FIG. 8A

| ID PART | DATA PART | ID PART | DATA PART |

FIG. 8B

| ID PART | DATA PART | ID PART | DATA PART |

FIG. 9A

| SM 8 | VFO1 26 | AM 1 | ID1 5 | VFO2 16 | AM 1 | ID2 5 | PA 1 |

FIG. 9B

| ID PART 63 | Gap 8 | VFO3 27 | Sync 4 | Data field 2458 | PA 1 | Buffer 23 |

FIG. 10A  | ID PART | DATA PART | ID PART | DATA PART |

FIG. 10B  | ID PART | DATA PART | ID PART | DATA PART | ID PART | DATA PART |

FIG. 11A

| SM 16 | VFO1 52 | AM 2 | ID1 6 | VFO2 32 | AM 2 | ID2 10 | PA 2 |
|---|---|---|---|---|---|---|---|

FIG. 11B

| ID PART 126 | Gap 40 | VFO3 54 | Sync 8 | Data field 4916 | PA 2 | Buffer 116 |
|---|---|---|---|---|---|---|

FIG. 11C

| ID PART 126 | Gap 20 | VFO3 27 | Sync 4 | Data field 2458 | PA 1 | Buffer 58 |
|---|---|---|---|---|---|---|

FIG. 12A

| ID PART | DATA PART | ID PART | DATA PART |

FIG. 12B

| ID PART | DATA PART | ID PART | DATA PART | ID PART | DATA PART |

FIG. 13A

| SM 16 | VFO1 52 | AM 2 | ID1 6 | VFO2 32 | AM 2 | ID2 10 | PA 2 |

FIG. 13B

| ID PART 126 | Gap 40 | VFO3 54 | Sync 8 | Data field 4916 | PA 2 | Buffer 242 |

FIG. 13C

| ID PART 126 | Gap 20 | VFO3 27 | Sync 4 | Data field 2458 | PA 1 | Buffer 58 |

FIG. 14A

| ID PART | DATA PART | ID PART | DATA PART |
|---|---|---|---|

FIG. 14B

| ID PART | DATA PART | ID PART | DATA PART | ID PART | DATA PART | ID PART |
|---|---|---|---|---|---|---|

FIG. 15A

| SM 24 | VFO1 78 | AM 3 | ID1 15 | VFO2 48 | AM 3 | ID2 15 | PA 3 |
|---|---|---|---|---|---|---|---|

FIG. 15B

| ID PART 189 | Gap 60 | VFO3 81 | Sync 12 | Data field 7374 | PA 3 | Buffer 174 |
|---|---|---|---|---|---|---|

FIG. 15C

| ID PART 189 | Gap 20 | VFO3 27 | Sync 4 | Data field 2458 | PA 1 | Buffer 58 |
|---|---|---|---|---|---|---|

FIG. 16A

| ID PART | DATA PART | ID PART |
|---|---|---|

FIG. 16B

| ID PART | DATA PART | ID PART | DATA PART | ID PART | DATA PART | ID PART |
|---|---|---|---|---|---|---|

FIG. 17A

| SM 24 | VFO1 78 | AM 3 | ID1 15 | VFO2 48 | AM 3 | ID2 15 | PA 3 |
|---|---|---|---|---|---|---|---|

FIG. 17B

| ID PART 189 | Gap 60 | VFO3 81 | Sync 12 | Data field 7374 | PA 3 | Buffer 363 |
|---|---|---|---|---|---|---|

FIG. 17C

| ID PART 189 | Gap 20 | VFO3 27 | Sync 4 | Data field 2458 | PA 1 | Buffer 58 |
|---|---|---|---|---|---|---|

STORAGE UNIT, OPTICAL RECORDING MEDIUM AND INFORMATION RECORDING METHOD

BACKGROUND OF THE INVENTION

The present invention generally relates to storage units, optical recording mediums and information recording methods, and more particularly to a storage unit for reproducing information which is recorded with a high density from a recording medium, an optical recording medium recorded with information with a high density, and an information recording method for recording information on a recording medium at with a high density.

As one type of optical recording medium, there is the magneto-optical recording medium typified by a magneto-optical disk. The magneto-optical disk has a substrate, and a recording layer made of a magnetic material and formed on the substrate, and records information using changes in magnetic field and heat caused by light. In addition, a magneto-optical effect is used when reproducing information from the magneto-optical disk. A data track for recording data, and a control track for recording medium information peculiar to the magneto-optical disk are provided on such a magneto-optical disk, where each track includes an identification (ID) part for identifying a sector which is a recording region and a data part for recording the data. In order to prevent rewriting of the information, the manufacturer of the magneto-optical disk records the control track by forming concavo-convex parts (embossed pits) on the substrate by use of a stamper or, records the control track simultaneously as the formation of guide grooves (lands/grooves) on the substrate by injection molding. For similar reasons, the ID part is recorded by forming the concavo-convex parts on the substrate by the same production process.

Various methods have been proposed conventionally to improve the recording density of the magneto-optical disk described above. According to one method which uses the magnetic super resolution (MSR), although the minimum recorded information which can be reproduced is generally determined by the wavelength, it is possible to reproduce information smaller than such a limit. In other words, by forming a magnetic mask by utilizing a temperature distribution of a laser power at the time of the reproduction, it is possible to reproduce only the necessary information from the magneto-optical disk.

FIG. 1 is a diagram for explaining the operating principle of the method which uses the MSR. In FIG. 1, the upper part shows a plan view of a part of 1 track on the magneto-optical disk, and the lower part shows a cross sectional view of the magneto-optical disk. A recording layer 101, an intermediate layer 102 and a reproducing layer 103 are provided on a substrate (not shown) of the magneto-optical disk. Arrows within these layers 101 through 103 indicate the magnetization direction. In FIG. 1, BM denotes a moving direction of the laser beam, DM denotes a moving direction (rotating direction) of the magneto-optical disk, RM denotes a reproducing magnetic field, and the hatching indicates an interface magnetic domain wall 104.

The intermediate layer 102 transfers or blacks the information recorded in the recording layer 101 to the reproducing layer 103 depending on the temperature. When reproducing the information recorded in the data part of the track in this manner, the temperature distribution of the laser power at the time of the reproduction is utilized to form a magnetic front mask 105 and a rear mask 106 at parts other than the reproducing position, so that it is possible to reproduce only the necessary information from the magneto-optical disk. In other words, in a case where the information recorded in the data part has a minimum mark length of 0.38 $\mu$m and this information is reproduced using a laser beam having a wavelength of 680 nm, for example, it is possible to reproduce only the necessary information from the magneto-optical disk by forming the masks 105 and 106, even if the spot diameter of the laser beam is approximately 1 $\mu$m and is approximately 3 times the minimum mark length.

However, the ID part of the control track is recorded by forming the concavo-convex parts (embossed pits) on the substrate of the magneto-optical disk. For this reason, even if an attempt is made to record the information in the ID part of the control track with the same density as the data part of the control track, the MSR cannot be used, and there was a problem in that the information recorded in the ID part cannot be reproduced accurately. In other words, in the case where the spot diameter of the laser beam is approximately 1 $\mu$m as described above, for example, approximately 3 pits fall within the beam spot even if an attempt is made to reproduce the pit having the minimum mark length of 0.38 $\mu$m, and it is possible to reproduce the information from only the necessary one of the 3 pits. This is because there is no known means for masking the information from the pits other than the necessary pit from among the 3 pits which fall within the beam spot.

SUMMARY OF THE INVENTION

Accordingly, it is a general object of the present invention to provide a novel and useful storage unit, optical recording medium and information recording method in which the problems described above are eliminated.

Another and more specific object of the present invention to provide a storage unit, an optical recording medium and an information recording method which can accurately reproduce information recorded in the form of concavo-convex parts, even when reproducing the information from the recording medium by the magneto-optical effect utilizing the MSR.

Still another object of the present invention is to provide a storage unit for optically reproducing information from an optical recording medium of a type having a control region which is prerecorded with control information with an embossed shape and a data region in which data is recorded by an optical means,.where the control information includes medium information peculiar to the recording medium, the control region and the data region have mutually different recording densities, and the storage unit comprises control means for switching a frequency of a read clock which is used when reproducing the control information and the data from the optical recording medium between a case where the control information is reproduced and a case where the data is reproduced. According to the storage unit of the present invention, because the data part and the identification part of the control region are both prerecorded with the embossed shape, it is possible to simplify the control of the read clock frequency, by making the read clock frequency the same for the data part and the identification part of the control region. For this reason, even if the recording density of the data region increases, it is possible to read the control information from the control region.

In the storage unit, the recording density of the control region may be 1/N times the recording density of the data region, where N>1.

In addition, in the storage unit, the control means may switch the frequency of the read clock when reproducing the control information to 1/N times the frequency of the read clock at a time of reproducing the data, where N>1.

In these cases, when the read clock frequency for reading the data part of the data region is set to 1/N times the read clock frequency for reading the identification part of the data region and the control region, it becomes possible to obtain the required read clock frequencies with a high accuracy.

On the other hand, the storage unit may further comprise a first generator which generates a reference clock, and a second generator which generates first and second clocks based on the reference clock, where the control means switches the frequency of the read clock to a frequency of the first clock when reproducing the control information from the control region, and to a frequency of the second clock when reproducing the data from the data region. In this case, by generating the first and second clocks based on the reference clock, it is possible to possible easily synchronize the first and second clocks. In addition, the first and second clocks can easily be generated by dividing the reference clock by different frequency dividing ratios, thereby making it unnecessary to provide a plurality of clock generating circuits, and the circuit scale is simplified.

In this case also, the frequency of the first clock may be 1/N times the frequency of the second clock, where N>1. In this case, when the read clock frequency for reading the data part of the data region is set to 1/N times the read clock frequency for reading the identification part of the data region and the control region, it becomes possible to obtain the required read clock frequencies with a high accuracy.

A further object of the present invention is to provide an optical recording medium comprising a control region pre-recorded with control information with an embossed shape, and a data region recorded with data by an optical means, where the control region has a recording density which is 1/N times a recording density of the data region, where N>1. According to the optical recording medium of the present invention, because the data part and the identification part of the control region are both prerecorded with the embossed shape, it is possible to simplify the control of the read clock frequency, by making the read clock frequency the same for the data part and the identification part of the control region. For this reason, even if the recording density of the data region increases, it is possible to read the control information from the control region.

Other objects and further features of the present invention will be apparent from the following detailed description when read in conjunction with the accompanying drawings.

BRIEF DESCRIPTION OF THE DRAWINGS

FIG. 5 is a system block diagram for explaining a read system of the ODC and the read LSI associated with the MPU;

FIGS. 8A and 8B are diagrams showing a track format of a conventional optical disk;

FIGS. 9A and 9B are diagrams showing a sector format of a conventional optical disk;

FIGS. 10A and 10B are diagrams showing a track format of a Specific Example 1 of the optical disk;

FIGS. 11A, 11B and 11C are diagrams showing a sector format of the Specific Example 1 of the optical disk;

FIGS. 12A and 12B are diagrams showing a track format of a Specific Example 2 of the optical disk;

FIGS. 13A, 13B and 13C are diagrams showing a sector format of the Specific Example 2 of the optical disk;

FIGS. 14A and 14B are diagrams showing a track format of a Specific Example 3 of the optical disk;

FIGS. 15A, 15B and 15C are diagrams showing a sector format of the Specific Example 3 of the optical disk;

FIGS. 16A and 16B are diagrams showing a track format of a Specific Example 4 of the optical disk; and FIGS. 17A, 17B and 17C are diagrams showing a sector format of the Specific Example 4 of the optical disk.

DESCRIPTION OF THE PREFERRED EMBODIMENTS

Figure 2:
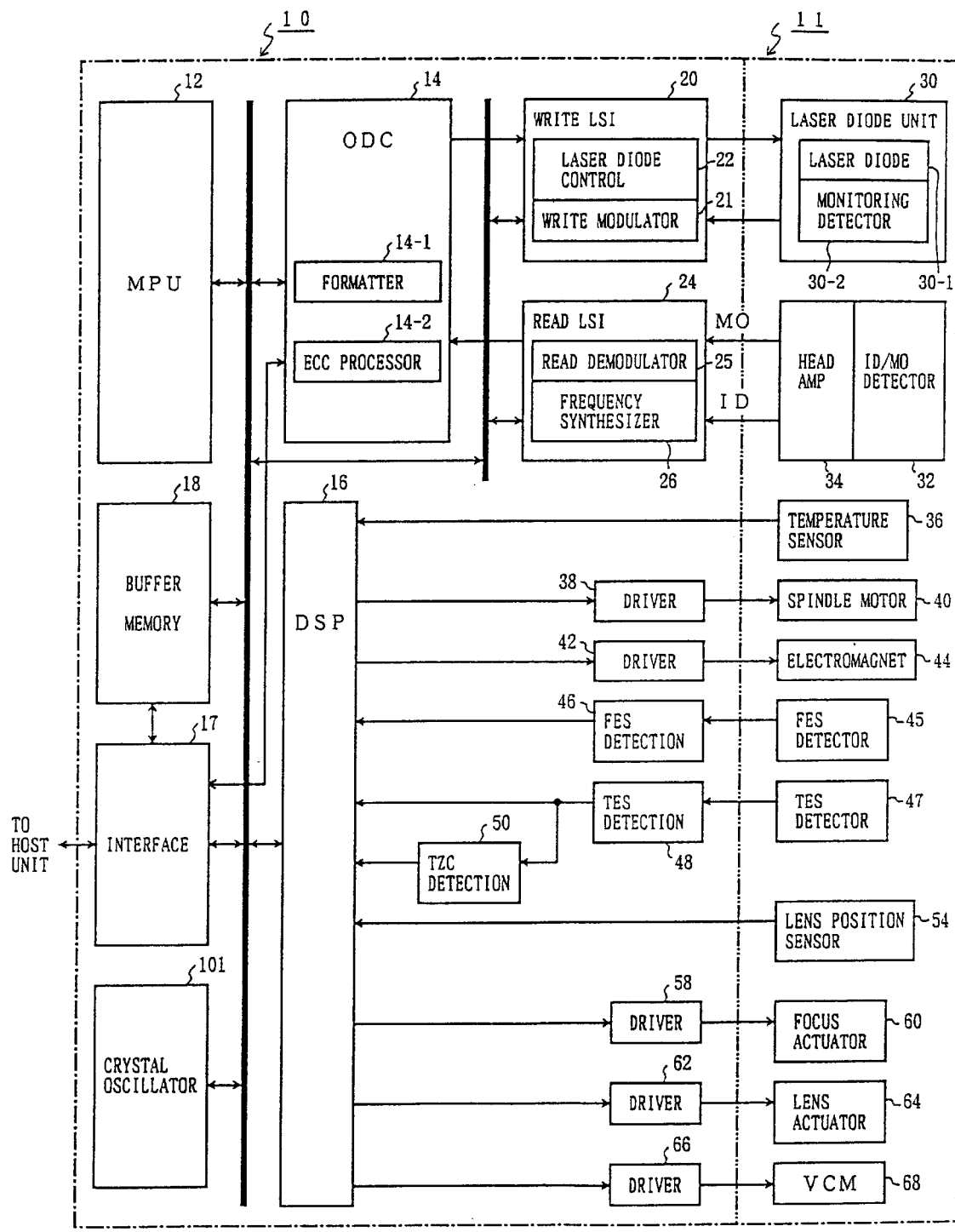
FIG. 2 is a system block diagram showing the general construction of an embodiment of a storage unit according to the present invention.

A description will be given of an embodiment of a storage unit according to the present invention. FIG. 2 is a system block diagram showing the general construction of this embodiment of the storage unit. In this embodiment of the storage unit, the present invention is applied to an optical disk unit. This embodiment of the storage unit employs an embodiment of an information recording method according to the present invention, and creates an embodiment of an optical recording medium according to the present invention.

As shown in FIG. 2, the optical disk unit generally includes a control unit 10 and an enclosure 11. The control unit 10 includes a microprocessor unit (MPU) 12 which generally controls the operation of the optical disk unit, an interface 17 which exchanges commands and data between a host unit (not shown), an optical disk controller (ODC) 14 which carries out processes required to read/write data with respect to an optical disk (not shown), a digital signal processor (DSP) 16, and a buffer memory 18.. The buffer memory 18 is used in common by the MPU 12, the ODC 14 and the interface 17, and includes a dynamic random access memory (DRAM), for example. A crystal oscillator 101 which is used to generate clocks is coupled to the MPU 12.

The ODC 14 includes a formatter 14-1 and error correction code (ECC) processor 14-2. At the time of a write access, the formatter 14-1 divides NRZ write data into sector units of the optical disk and generates a recording format, and the ECC processor 14-2 generates and adds an ECC with respect to sector write data units and also generates and adds if necessary a cyclic redundancy check (CRC) code. Further, the ECC processor 14-2 converts the sector data with the encoded ECC into a 1–7 run length limited (RLL) code, for example.

At the time of a read access, a reverse conversion of the 1–7 RLL is carried out with respect to the sector data, and after carrying out the CRC, the error detection and error correction using the ECC are carried out in the ECC processor 14-2. Further, the NRZ data in sector units are connected in the formatter 14-2 so as to transfer a NRZ read data stream to the host unit.

A write large scale integrated (LSI) circuit 20 is provided with respect to the ODC 14. This write LSI circuit 20 includes a write modulator 21 and( a laser diode control circuit 22. A control output of the laser diode control circuit 22 is supplied to a laser diode unit 30 which is provided in an optical unit of the enclosure 11. The laser diode unit 30 integrally includes a laser diode 30-1 and a monitoring detector 30-2. The write modulator 21 converts the write data into the data format of the pit position modulation (PPM) recording (or mark recording) or, a pulse width modulation (PWM) recording (or edge recording).

When recording and reproducing data with respect to the optical disk using the laser diode unit 30, this embodiment can use any one of writable magneto-optical (MO) cartridge mediums having the storage capacities of 128 MB, 230 MB, 540 MB and 640 MB. In the MO cartridge mediums having the storage capacities of 128 MB and 230 MB, the PPM recording is employed to record the data in correspondence with the existence and non-existence of marks on the optical disk. In addition, a constant angular velocity (CAV) is used as the recording format of the optical disk having the storage capacity of 128 MB, and a zone constant angular velocity (ZCAV) is used as the recording format of the optical disk having the storage capacity of 230 MB, where 1 zone is provided as a user region in the case of the optical disk having the storage capacity of 128 MB and 10 zones are provided as the user region in the case of the optical disk having the storage capacity of 230 MB.

In the MO cartridge mediums having the storage capacities of 540 MB and 640 MB and used for the high density recording, the PWM recording is employed to record the data in correspondence with the edges of the marks, that is, leading and trailing edges, on the optical disk. The difference between the storage capacities of the optical disk having the storage capacity of 540 MB and the optical disk having the storage capacity of 640 MB is due to the different sector capacities. The optical disk has the storage capacity of 540 MB if the sector capacity is 512 bytes, and the optical disk has the storage capacity of 640 MB if the sector capacity is 2048 bytes. In addition, the zone CAV is used as the recording format of the optical disk, where 18 zones are provided as the user region in the case of the optical disk having the storage capacity of 540 MB and 11 zones are provided as the user region in the case of the optical disk having the storage capacity of 640 MB.

Hence, this embodiment can cope with the optical disks having the storage capacities of 128 MB, 230 MB, 540 MB and 640 MB, and also cope with direct overwrite type optical disks having the storage capacities of 230 MB, 540 MB and 640 MB. Accordingly, when the optical disk is loaded into the optical disk unit, an identification (ID) part of the optical disk is first read so as to recognize the type of the optical disk by the MPU 12 from the intervals of the pits, and a recognition result of the type of loaded optical disk is notified to the ODC 14.

A read LSI circuit 24 is provided as a read system with respect to the ODC 14. A read demodulator 25 and a frequency synthesizer 26 are provided in the read LSI circuit 24. An ID/MO detector 32 of the enclosure 11 detects a laser beam emitted from the laser diode 30-1 and returned via the optical disk, and a detection signal from this ID/MO detector 32 is input as an ID signal and a MOD signal to the read LSI circuit 24 via a head amplifier 34.

The read demodulator 25 of the read LSI circuit 24 includes the functions of circuits such as an automatic gain control (AGC) circuit, a filter and a sector mark detection circuit. Hence, the read demodulator 25 generates a read clock and read data from the input ID signal and MO signal, and demodulates the PPM data or the PWM data back into the original NRZ data. In addition, since the zone CAV is employed, the MPU 12 controls a setting of a frequency dividing ratio with respect to the frequency synthesizer 26 of the read LSI circuit 24 in order to generate a clock frequency in correspondence with the zone.

The frequency synthesizer 26 is a phase locked loop (PLL) circuit having a programmable frequency divider, and generates as a read clock a reference clock having a predetermined specific frequency depending on the zone position on the optical disk. In other words, the frequency synthesizer 26 is formed by the PLL circuit having the programmable frequency divider, and generates the reference clock having a frequency fo based on $fo=(m/n)\cdot fi$ according to a frequency dividing ratio m/n which is set by the MPU 12 depending on a zone number.

A denominator n of the frequency dividing ratio m/n is a specific value depending on the type of optical disk having the storage capacity of 128 MB, 230 MB, 540 MB or 640 MB. In addition, a numerator m of the frequency dividing ratio m/n is a value which changes depending on the zone position on the optical disk, and table information of the values corresponding to the zone numbers are prepared in advance with respect to each type of optical disk. Moreover, fi denotes a reference clock frequency generated outside the frequency synthesizer 26.

The read data demodulated in the read LSI circuit 24 is supplied to the read system of the ODC 14, and after carrying out the reverse conversion of the 1–7 RLL, the CRC and the ECC processes are carried out by the encoding function of the ECC processor 14-2 so as to restore the original NRZ data. Next, the formatter 14-1 connects and converts the NRZ sector data into the NRZ read data stream, and this NRZ read data stream is transferred to the host unit via the buffer memory 18 and the interface 17.

A detection signal from a temperature sensor 36 provided in the enclosure 11 is supplied with respect to the MPU 12 via the DSP 16. Based on an environmental temperature within the optical disk unit detected by the temperature sensor 36, the MPU 12 controls the light emission powers for the read, write and erase in the laser diode control circuit 22.

The MPU 12 controls a spindle motor 40 provided in the enclosure 11 via the DSP 16 and a driver 38. In this embodiment, since the zone CAV is employed as the recording format of the optical disk, the spindle motor 40 is rotated at a constant speed of 3000 rpm, for example.

In addition, the MPU 12 controls an electromagnet 44 provided in the enclosure 11 via the DSP 16 and a driver 42. The electromagnet 44 is arranged on a side opposite to the side of the optical disk on which the laser beam is irradiated within the optical disk unit which is loaded with this optical disk. This electromagnet 44 supplies an external magnetic field on the optical disk at the time of the recording and erasure.

The DSP 16 is provided with a servo function for positioning the laser beam from the laser diode 30-1 with respect to the optical disk, and functions as a seek controller and an on-track controller which enable the laser beam to seek a target track and to be positioned on the target track. The seek control and the on-track control may be carried out simultaneously in parallel with the write access or the read access of the MPU 12 with respect to a host command.

In order to realize the servo function of the DSP 16, a focus error signal (FES) detector 45 is provided in the optical unit of the enclosure 11 so as to detect the laser beam emitted from the laser diode 30-1 and returned via the optical disk. A FES detection circuit 46 generates a FES E1 from a detection signal received from the FES detector 45, and inputs this FES E1 to the DSP 16.

A tracking error signal (TES) detector 47 is also provided in the optical unit of the enclosure 11 so as to detect the laser beam emitted from the laser diode 30-1 and returned via the optical disk. A TES detection circuit 48 generates a TES E2 from a detection signal received from the TES detector 47, and inputs this TES E2 to the DSP 16. The TES E2 is also input to a track zero crossing (TZC) detection circuit 50, and this TZC detection circuit 50 generates a TZC signal E3 which is input to the DSP 16.

A lens position sensor 52 is provided in the enclosure 11. This lens position sensor 52 detects a position of an objective lens through which the laser beam is irradiated on the optical disk. A lens position detection signal (LPOS) E4 from the lens position sensor 52 is input to the DSP 16. The DSP 16 controls and drives a focus actuator 60, a lens actuator 64 and a voice coil motor (VCM) 68 via corresponding drivers 58, 62 and 66, so as to control the position of a beam spot formed by the laser beam on the optical disk.

Figure 1:
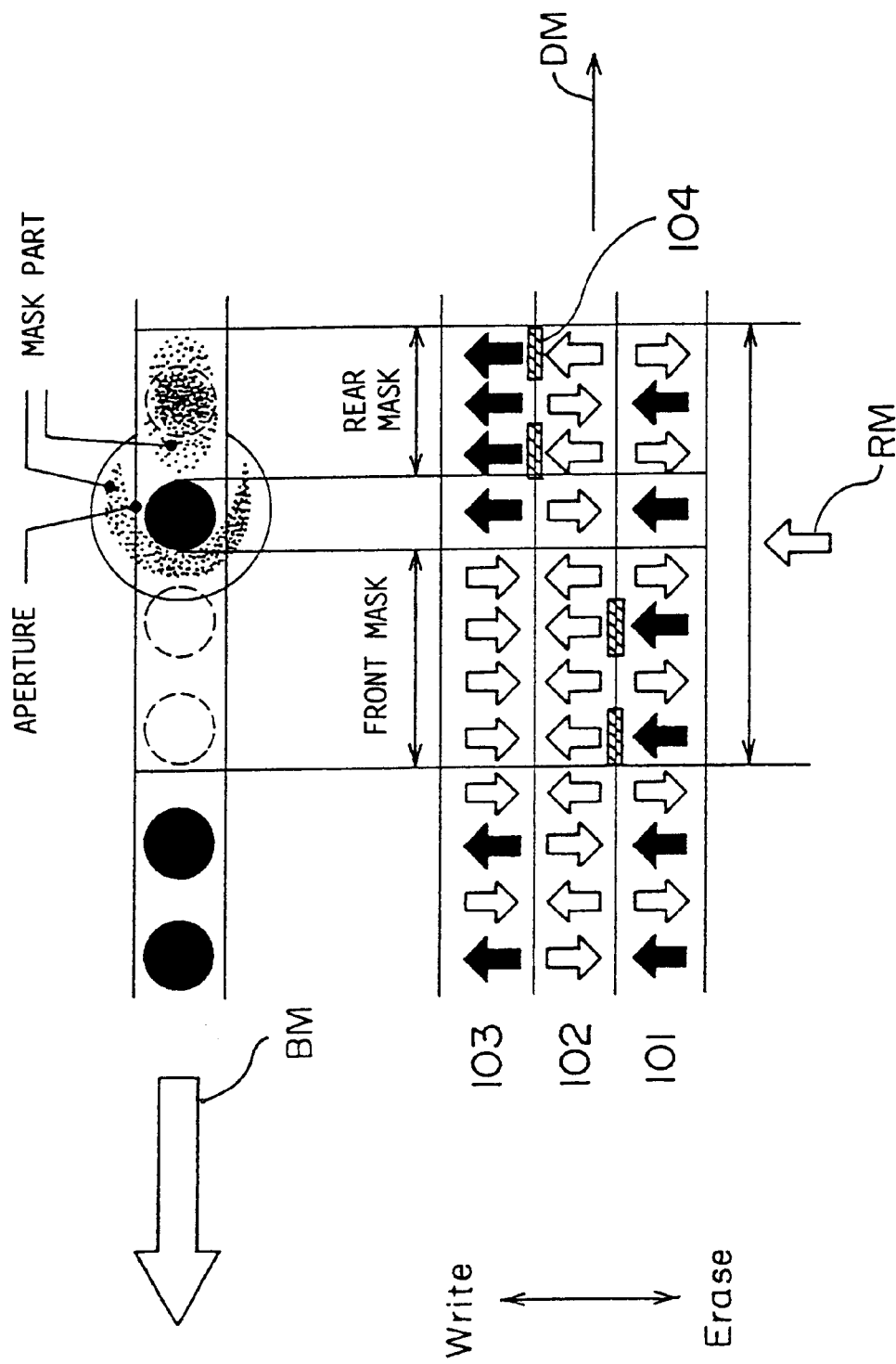
FIG. 1 is a diagram for explaining the operating principle of a method which uses MSR.
Figure 3:
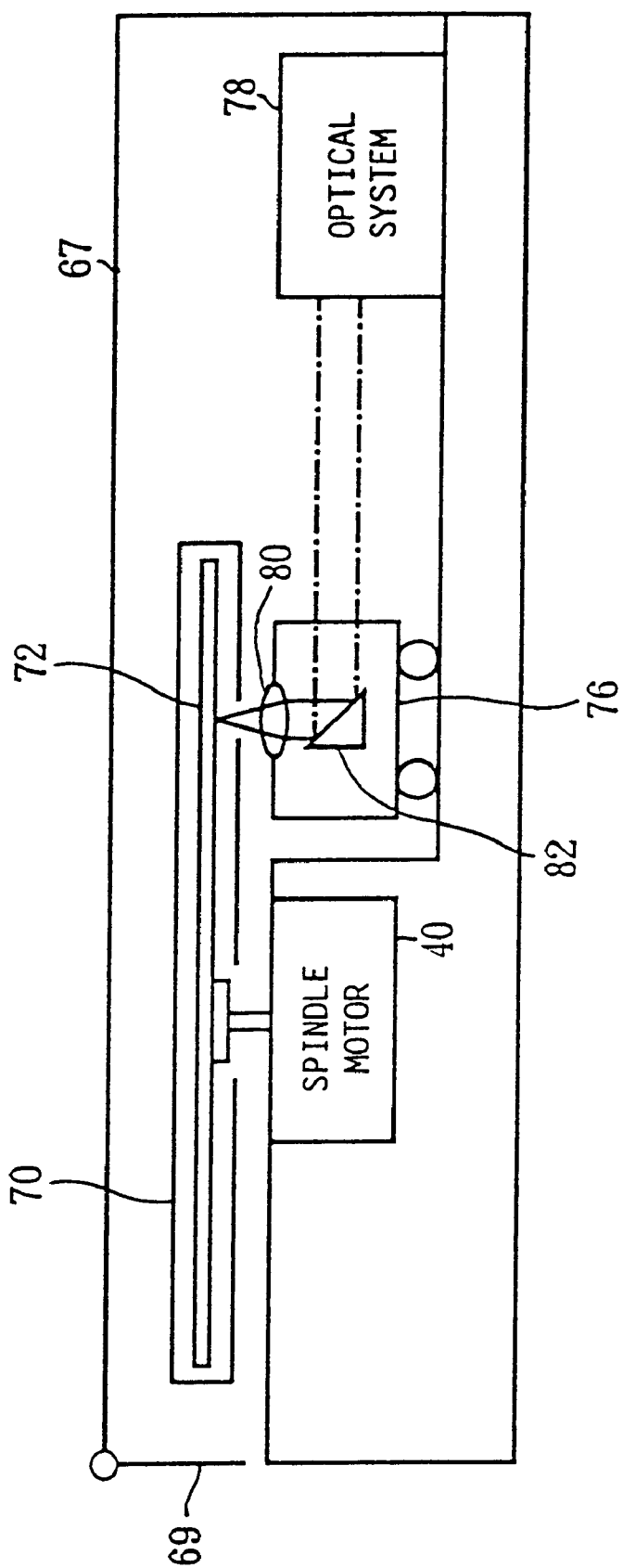
FIG. 3 is a cross sectional view showing the general construction of an enclosure.

FIG. 3 is a cross sectional view showing the general construction of the enclosure 11. As shown in FIG. 3, the spindle motor 40 is provided within a housing 67. By inserting a MO cartridge 70 into the housing 67 from the side of an inlet door 69, an optical disk (MO disk) 72 accommodated within the MO cartridge 70 engages a rotary shaft of the spindle motor 40, thereby loading the optical disk 72 with respect to the optical disk unit. The optical disk 72 has the layer structure shown in FIG. 1, for example, when utilizing the MSR.

A carriage 76 is provided below loaded the optical disk 72 within the MO cartridge 70. This carriage 76 is freely movable in a direction which traverses tracks on the optical disk 72 when driven by the VCM 64. An objective lens 80 is mounted on the carriage 76. The laser beam emitted from the laser diode 30-1 which is provided within a fixed optical system 78 is reflected by a mirror 82, and is irradiated on the recording surface of the optical disk 72 via the objective lens 80, thereby forming a beam spot on the recording surface.

The movement of the objective lens 80 along an optical axis is controlled by the focus actuator 60 of the enclosure 11 shown in FIG. 2. In addition, the objective lens 80 is movable in a radial direction which traverses the tracks on the optical disk 72 by the lens actuator 64, within a range of several tens of tracks. The position of the objective lens 80 mounted on the carriage 76 is detected by the lens position sensor 54 shown in FIG. 2. The lens position sensor 54 outputs the lens position detection signal E4 which takes a value zero at a neutral position where the optical axis of the objective lens 80 is perpendicular to the recording surface of the optical disk 72, and has a magnitude and a polarity depending on the amount the optical axis of the objective lens 80 moves towards the inner or outer peripheral side of the optical disk 72.

Figure 4:
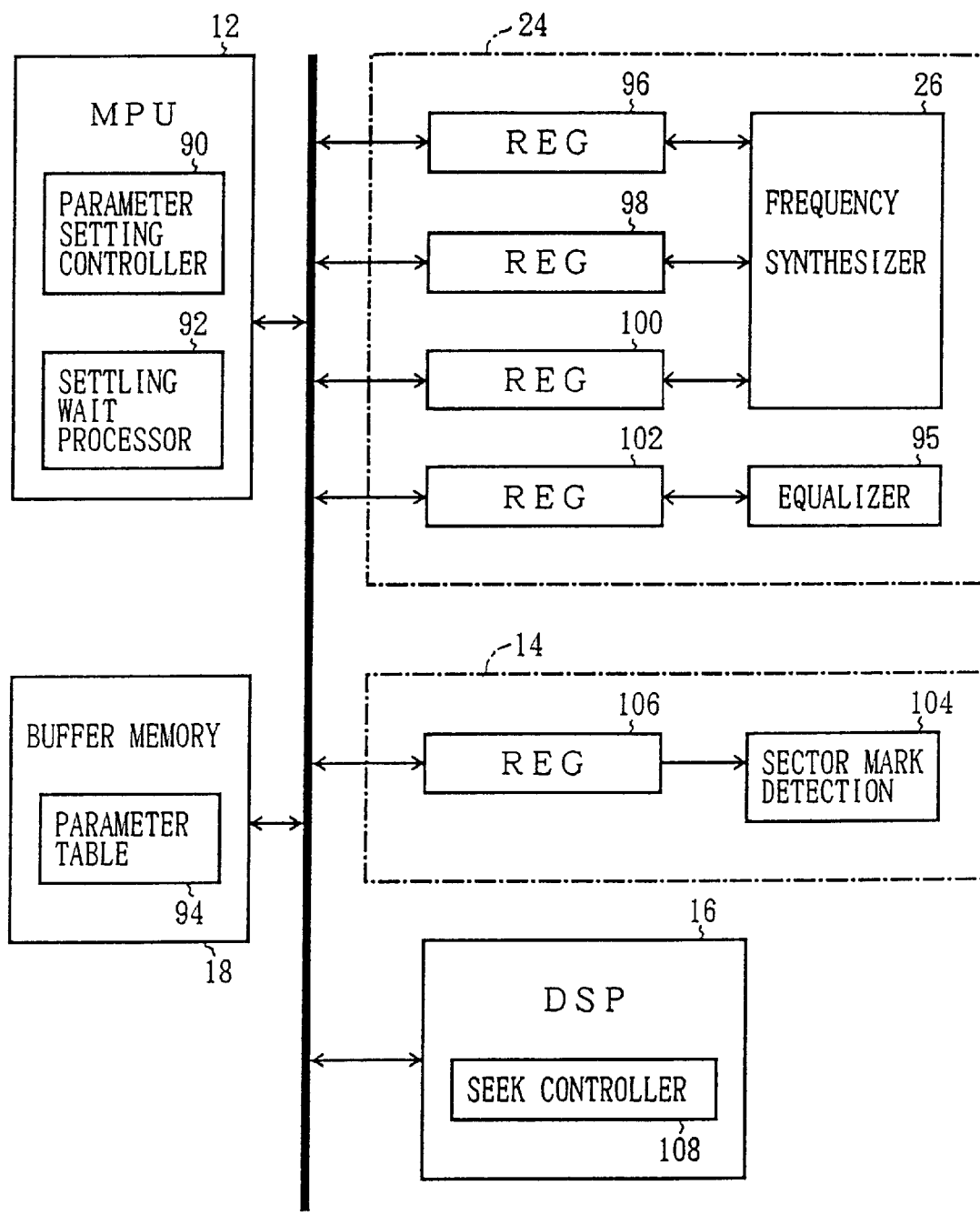
FIG. 4 is a system block diagram for explaining parameter setting control and settling wait functions with respect to a read LSI, ODC and a DSP of a MPU in an optical disk unit.

FIG. 4 is a system block diagram for explaining the parameter setting control and settling wait functions of the MPU 12 of the optical disk unit shown in FIG. 2 with respect to the read LSI circuit 24, the ODC 14 and the DSP 16.

The MPU 12 includes a parameter setting controller 90 which operates based on a read command from the host unit, and a settling wait processor 92 for waiting the settling after the parameter setting. The parameter setting controller 90 controls the setting of the parameters which are required to make various kinds of accesses by use of a parameter table 94 which is developed in a RAM or the like included in the buffer memory 18.

Elements the-parameters of which are to be set by the parameter setting controller 90 of the MPU 12 include the frequency synthesizer 26 and an equalizer circuit 95 within the read LSI circuit 24. The equalizer circuit 95 is provided with respect to the MO signal which is obtained from the ID/MO detector 32. In this embodiment, 3 control registers 96, 98 and 100 are provided with respect to the frequency synthesizer 26.

The parameters related to the frequency dividing ratio m/n, the frequency setting of a voltage controller oscillator (VCO) and the selection of a PLL damping resistance are respectively set in the control registers 96, 98 and 100 by the parameter setting controller 90 of the MPU 12. A control register 102 is provided with respect to the equalizer circuit 95. Parameters related to an equalizer cutoff frequency are set in the control register 102 by the parameter setting controller 90 of the MPU 12. Furthermore, a control register 106 is provided with respect to a sector mark detection circuit 104 of the ODC 14. Parameters related to a sector mark detection cutoff frequency are set in the control register 106 by the parameter setting controller 90 of the MPU 12.

A seek command is transferred to the DSP 16 when the MPU 12 executes a read command from the host unit. The DSP 16 is provided with a seek controller 108. Based on the seek command, the seek controller 108 of the DSP 16 carries out a seek control for positioning the beam spot to a target track on the optical disk 72 simultaneously in parallel with the process of the MPU 12.

Therefore, the parameter setting controller 90 of the MPU 12 can optimize the cutoff frequency of the MO signal equalizer circuit 95 within the read LSI circuit 24 by controlling the setting of the control register 102. In addition, the parameter setting controller 90 can optimize the frequency dividing ratio m/n, the VCO frequency setting and the PLL damping resistance selection of the frequency synthesizer 26 within the read LSI circuit 24 by controlling the setting of the control registers 96, 98 and 100. Furthermore, the parameter setting controller 90 can optimize the cutoff frequency of the sector mark detection circuit 104 within the ODC 14 by controlling the setting of the control register 106.

The firmware of the control unit 10 is installed, for example, by reading the firmware from the optical disk 72 inserted into the enclosure 11 and storing the firmware in the buffer memory 18 under the control of the host unit, and the firmware stored in the buffer memory 18 is executed. In addition, programs executed by the MPU 12 are similarly read from the optical disk 72 inserted into the enclosure 11 and stored in the buffer memory 18 by the MPU 12 under the control of the host unit, for example, and the programs stored in the buffer memory 18 are executed. In other words, The programs of the MPU 12 for realizing an identification information recording method according to the present invention may be recorded on a storage medium according to the present invention, and in this case, the storage medium according to the present invention is not limited to the optical disk 72. The storage medium according to the present invention may be made selected from various kinds of disks including magnetic disks, various kinds of semiconductor memory devices, various kinds of memory cards, and the like.

When installing the firmware, a version number of the firmware is stored in a version number memory within the buffer memory 18 by a known means. In addition, a number of times this firmware is installed in the past in the storage unit shown in FIG. 2 and in other storage units is stored in a version number counter within the buffer memory 18.

FIG. 5 is a system block diagram for explaining the read system of the ODC 14 and the read LSI 24 associated with the MPU 12 of the optical disk unit shown in FIG. 2. In FIG. 5, those parts which are the same as those corresponding parts in FIGS. 2 and 4 are designated by the same reference numerals, and a description thereof will be omitted.

A MO signal (data signal) and an ID signal from the ID/MO detector 32 which detects the light returned via the optical disk 72 are input to the read LSI 24. The ID signal is obtained by detecting the existence of embossed pits as a change in a light quantity on the ID/MO detector 32. Since the data of the ID part and the control track are recorded in the form of the embossed pits, the ID signal is read from the ID part and the control track. The MO signal is subjected to a waveform equalization in an equalizer circuit 94, and is thereafter amplified in an automatic gain control (AGC) circuit 110. On the other hand, the ID signal is amplified in an AGC circuit 112.

With respect to the equalizer circuit 94 for the MO signal, the parameter setting controller 90 of the MPU 12 shown in FIG. 4 sets an optimizes an equalizer cutoff frequency of the control register 102 depending on the zone position on the optical disk 72. An output of the AGC circuit 110 for the MO signal and an output of the AGC circuit 112 for the ID signal are input to a multiplexer (MUX) 114, and an output of this multiplexer 114 is selected in response to an ID/MO switching signal from the MPU 12 and successively supplied to a differentiating circuit 116, so as to detect a peak level by a zero-crossing.

An output of the differentiating circuit 116 is supplied to a data demodulating circuit 117 which generates a read clock and a read data. During a seek operation or the like when no ID signal or MO signal is obtained, the frequency synthesizer 26 generates a frequency of a target reference clock based on a clock from a frequency dividing circuit 119, responsive to a setting of a frequency dividing ratio corresponding to a zone ratio of a target track. For example, the clock from the crystal oscillator 101 shown in FIG. 2 is supplied to the frequency dividing circuit 119, and this clock is frequency-divided by a frequency dividing ratio which depends on a data/control track switching signal obtained from the MPU 12 or the ODC 14 before being supplied to the frequency synthesizer 26. In addition, when an on-track state is reached upon completion of the seek operation, the frequency synthesizer 26 generates a reference clock which follows a peak detection pulse of the ID signal or the MO signal from the differentiating circuit 116, based on the clock received from the frequency dividing circuit 119.

The data demodulating circuit 117 generates read data by synchronizing the ID signal or the MO signal obtained in the on-track state after completion of the seek operation to the read clock generated from the frequency synthesizer 26. In this state, the data demodulating circuit 117 carries out a demodulation to restore the PPM modulated data or the PWM modulated data which is obtained as the read data to a read data before the modulation.

The output of the differentiating circuit is further differentiated by a differentiating circuit 118, and an output of the differentiating circuit 118 is compared with a predetermined threshold level in a comparator circuit 120, so as to output a sector mark pulse signal from the comparator circuit 120. This sector mark pulse signal indicates a sector mark recorded in the ID region.

The read system of the ODC 14 is formed by a RLL data demodulating circuit 122, a sync byte detection circuit 124, an address mark detection circuit 126, an ECC circuit 128, a CRC check circuit 130, an ID detection circuit 132, and the sector mark detection circuit 104.

The read data and the read clock demodulated in the read LSI 24 are input to the RLL data demodulating circuit 122, the sync byte detection circuit 124 and the address mark detection circuit 126.

With respect to the read data of the ID signal at the sector head which is first obtained, the sync byte detection circuit 124 carries out a sync byte detection, and the address mark detection circuit 126 then carries out an address mark detection. Outputs indicative of the detections made in the sync byte detection circuit 124 and the address mark detection circuit 126 are supplied to the RLL data demodulating circuit 122, so as to recognize the read data of the data part (MO part) subsequent to the ID part and to demodulate the read data by the reverse conversion of the 1–7 RLL.

The read data demodulated in the RLL data demodulating circuit 122 is supplied to the ECC circuit 128, the CRC check circuit 130 and the ID detection circuit 132. The CRC check circuit 130 detects an error of a data stream made up of the data and the ECC, and supplies a result of the error detection to the ECC circuit 128. The ECC circuit 128 carries out an error detection and correction with respect to the read data based on the ECC, and outputs a NRZ data.

The ID detection circuit 132 detects ID information of the read data, and outputs an ID detection update notification signal. The address mark detection circuit 126 outputs an address mark detection signal with respect to the MPU 12, and the sector mark detection circuit 104 outputs a sector mark detection signal with respect to the MPU 12.

The control register 106 shown in FIG. 4 is provided with respect to the sector mark detection circuit 104 which is provided in the read system of the ODC 14. A cutoff frequency is set and controlled with respect to the control register 106 from the setting controller 90 of the MPU 12 depending on the zone position, and a cutoff frequency characteristic of the sector mark detection circuit 104 is optimized.

Figure 6:
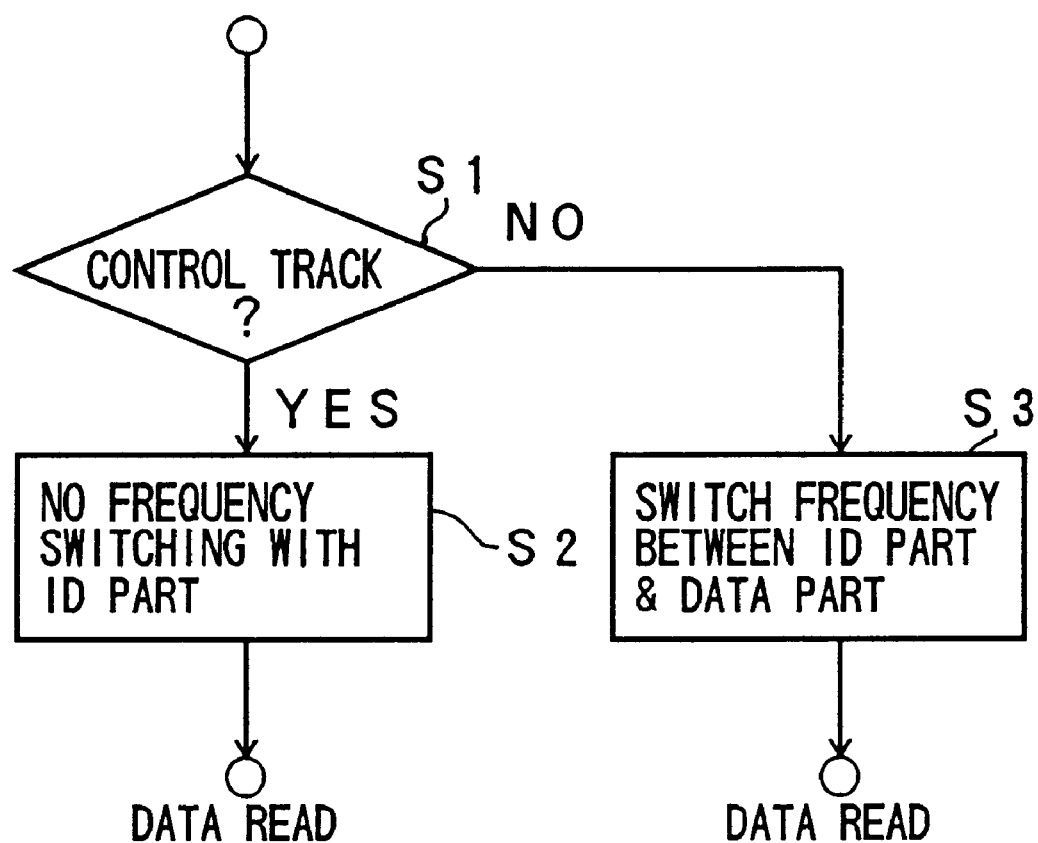
FIG. 6 is a flow chart for explaining the switching of the clock frequency.

FIG. 6 is a flow chart for explaining the switching of the clock frequency in this embodiment. A process shown in FIG. 6 corresponds to the operations of the MPU 12 or the ODC 14, the frequency dividing circuit 119 and the frequency synthesizer 26. In addition, FIG. 7 is a perspective view showing a portion of the optical disk 72 on an enlarged scale.

Figure 7:
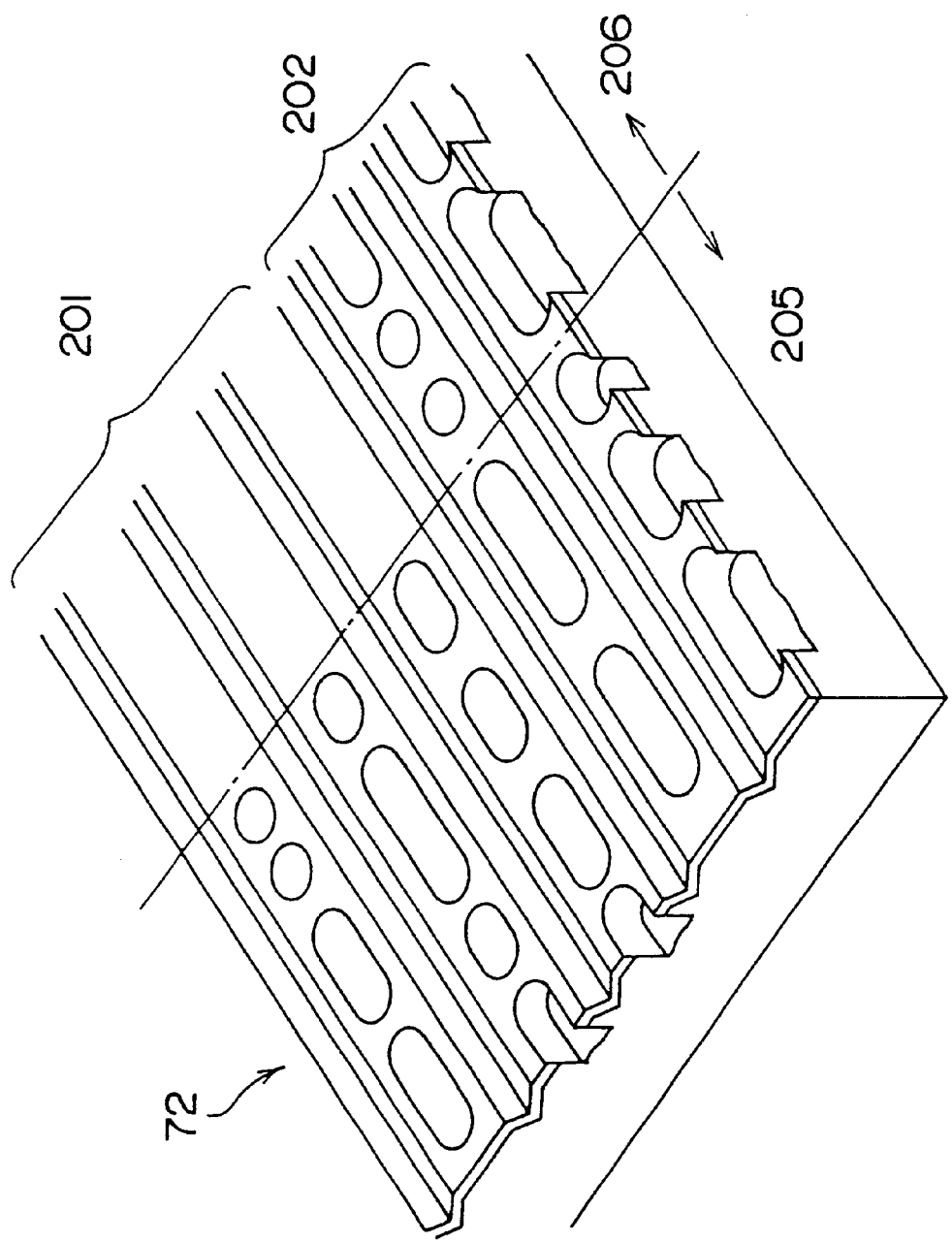
FIG. 7 is a perspective view showing a portion of an optical disk on an enlarged scale.

The physical format is determined in advance with respect to a data track (data region) 201 and a control track (control region) 202 on the optical disk 72 shown in FIG. 7. Hence, this embodiment switches the clock frequency based which one of the tracks (regions) is accessed. FIG. 7 also shows an ID part 205 and a data part 206 on the optical disk 72. In this embodiment, the information recorded on the control track 202 is recorded in the form of the concavo-convex parts (embossed pits) within both the ID part 205 and the data part 206. On the control track 202, information for identifying the recording region of the data part 206 is recorded in the ID part 205, and medium information peculiar to the optical disk 72 or the like is recorded in the data part 206. On the other hand, the information recorded on the data track 201 is recorded in the form of the concavo-convex parts (embossed pits) within the ID part 205, but is recorded using the magneto-optical effect within the data part 206. On the data track 201, information for identifying the recording region of the data part 206 is recorded in the ID part 205, and the data is recorded in the data part 206.

In FIG. 6, a step S1 decides whether or not the track which is to be read is the control track 202. If the decision result in the step S1 is YES, a step S2 judges that the switching of the read clock frequency is unnecessary between the ID part 205 and the data part 206, and the read operation is continued. On the other hand, if the decision result in the step S1 is NO, a step S3 judges that the switching of the read clock frequency is necessary between the ID part 205 and the data part 206 and carries out the necessary switching operation. More particularly, the read clock frequency used to read the ID part 205 is switched to 1/N (N>1) times the read clock frequency used to read the data part 206.

In other words, when reading the data track 201, the MPU 12 or the ODC 14 supplies to the frequency dividing circuit 119 a data/control switching signal for setting the same read clock frequency when reading the ID part 205 and when reading the data part 206. On the other hand, when reading the control track 202, the MPU 12 or the ODC 14 supplies to the frequency dividing circuit 119 a data/control switching signal for setting the read clock frequency when reading the ID part 205 to a frequency which is 1/N (N>1) times the read clock frequency at the time of reading the data part 206. Therefore, the read clock frequency used to read the information recorded in the ID part 205 and the data part 206 of the control track 202 and the ID part 205 of the data track 201 is switched and set to 1/N times the read clock frequency used to read the information recorded in the data part 206 of the data track 201. In order to simplify the circuit construction and the like, it is preferable that N is set to an integer greater than or equal to 2.

In addition, when writing information in the data part 206 of the data track 201 on the optical disk 72, a write clock frequency within the write LSI 20 is switched and set similarly at the time of the read operation. In this case, when writing the information on the data track 201, the MPU 12 or the ODC 14 controls the write LSI 20 so that a write clock frequency used to write the information in the data part 206 is set to N (N>1) times the write clock frequency used to write the information in the ID part 205. In this case, it is also preferably that N is set to an integer greater than or equal to 2.

Of course, the switching of the clock frequency in the process shown in FIG. 6 may be enabled, for example, when the optical disk 72 loaded into the enclosure 11 during the load process of the control unit 10 is recognized as a medium utilizing the MSR.

Next, a description will be given of a particular format of the optical disk 72 used in this embodiment. For the sake of comparison, FIGS. 8A and 8B show a track format of a conventional optical disk having a diameter of 90 mm, a memory capacity of 640 MB and in conformance with the ISO/IEC15041, and FIGS. 9A and 9B show a sector format of this conventional optical disk. In the optical disk having the diameter of 90 mm, the memory capacity of 640 MB and in conformance wit the ISO/IEC15041, the minimum mark length of the ID part and the data part is set to 0.64 μm for both the control track and the data track, and approximately the limit mark length is reached when the wavelength of the laser beam used is 680 nm.

FIG. 8A shows the format of the control track, and FIG. 8B shows the format of the data track. FIG. 9A shows the structure of a 63-byte ID part (header), and FIG. 9B shows the structure of a 2584-byte sector. In FIG. 9A, the ID part includes a sector mark SM, a VFO1 field, an address mark AM, an ID1 field, a VFO2 field, an address mark AM, an ID2 field, and a postamble PA, and the number of bytes of each of these portions is indicated in correspondence with these portions. On the other hand, in FIG. 9B, the sector includes, in addition to the ID part described above, fields denoted by Gap, VFO3, Sync, Data Field, PA and Buffer, and the number of bytes of each of these fields is indicated in correspondence with these fields. In the case of the optical disk having the diameter of 90 mm, the memory capacity of 640 MB and in- conformance with the ISO/IEC15041, the sector format shown in FIGS. 9A and 9B is used in common with respect to both the data track and the control track.

Specific Example 1 of the Format

In order to achieve a memory capacity of 1.3 GB which is approximately 2 times the memory capacity of 640 MB using the above described optical disk having the diameter of 90 mm, the memory capacity of 640 MB and in conformance with the ISO/IEC15041, it is necessary to set the minimum mark length to 0.32 μm. In the data part 206 of the data track 201 on the optical disk 72, it is possible to realize a minimum mark length of 0.32 μm utilizing the MSR. But in the ID part 205 of the data track 201 and the ID part 205 and the data part 206 of the control track 202, it becomes impossible to reproduce the information if the minimum mark length is set to 0.32 μm. Hence, the minimum mark length is set to 0.64 μm as in the conventional case in the ID part 205 of the data track 201 and the ID part 205 and the data part 206 of the control track 202. The ratio with respect to the entire storage capacity of the optical disk 72 occupied by the ID part 205 of the data track 201 and the control track 202 is small, and thus, the storage capacity of the optical disk 72 as a whole will not be greatly reduced by such an arrangement. The track format for this case is shown in FIGS. 10A and 10B, and the sector format for this case is shown in FIGS. 11A, 11B and 11C. In FIGS. 11A through 11C, those parts which are the same as those corresponding parts in FIGS. 9A and 9B are designated by the same reference numerals.

FIG. 10A shows the format of the control track, and FIG. 10B shows the format of the data track. In addition, FIG. 11A shows the structure of a 126-byte ID part, FIG. 11B shows the structure of a 5264-byte sector on the control track 202, and FIG. 11C shows the structure of a 2694-byte sector on the data track 201. In FIG. 11A, the ID part includes a sector mark SM, a VFO1 field, an address mark AM, an ID1 field, a VFO2 field, an address mark AM, an ID2 field, and a postamble PA, and the number of bytes of each of these portions is indicated in correspondence with these portions. On the other hand, in FIG. 11B, the sector includes, in addition to the ID part described above, fields denoted by Gap, VFO3, Sync, Data Field, PA and Buffer, and the number of bytes of each of these fields is indicated in correspondence with these fields. Furthermore, in FIG. 11C, the sector includes, in addition to the ID part described above, fields denoted by Gap, VFO3, Sync, Data Field, PA and Buffer, and the number of bytes of each of these fields is indicated in correspondence with these fields.

In this Specific Example 1, the number of bytes of the control track 202 is approximately 2 (N=2) times the number of bytes of the data track 201 based on the recording frequency of the data part 206 of the data track 201. Except for the fact that the storage capacity is approximately 2 times that of the optical disk having the diameter of 90 mm, the storage capacity of 640 MB and in conformance with the ISO/IEC15041, the optical disk 72 is basically in conformance with the ISO/IEC15041.

In this case, the recording density in the track longitudinal direction is 0.57 μm, for example, on the control track 202 and in the ID part 205 of the data track 201. The recording density in the track longitudinal direction is 0.29 μm, for example, in the data part 206 of the data track 201.

Specific Example 2 of the Format

In order to achieve a memory capacity of 1.3 GB which is approximately 2 times the memory capacity of 640 MB using the above described optical disk having the diameter of 90 mm, the memory capacity of 640 MB and in conformance with the ISO/IEC15041, it is necessary to set the minimum mark length to 0.32 μm. In the data part 206 of the data track 201 on the optical disk 72, it is possible to realize a minimum mark length of 0.32 μm utilizing the MSR. But in the ID part 205 of the data track 201 and the ID part 205 and the data part 206 of the control track 202, it becomes impossible to reproduce the information if the minimum mark length is set to 0.32 μm. Hence, the minimum mark length is set to 0.64 μm as in the conventional case in the ID part 205 of the data track 201 and the ID part 205 and the data part 206 of the control track 202. The ratio with respect to the entire storage capacity of the optical disk 72 occupied by the ID part 205 of the data track 201 and the control track 202 is small, and thus, the storage capacity of the optical disk 72 as a whole will not be greatly reduced by such an arrangement. The track format for this case is shown in FIGS. 12A and 12B, and the sector format for this case is shown in FIGS. 13A, 13B and 13C. In FIGS. 13A through 13C, those parts which are the same as those corresponding parts in FIGS. 9A and 9B are designated by the same reference numerals.

FIG. 12A shows the format of the control track, and FIG. 12B shows the format of the data track. In addition, FIG. 13A shows the structure of a 126-byte ID part, FIG. 13B shows the structure of a 5388-byte sector on the control track 202, and FIG. 13C shows the structure of a 2694-byte sector on the data track 201. In FIG. 13A, the ID part includes a sector mark SM, a VFO1 field, an address mark AM, an ID1 field, a VFO2 field, an address mark AM, an ID2 field, and a postamble PA, and the number of bytes of each of these portions is indicated in correspondence with these portions. On the other hand, in FIG. 13B, the sector includes, in addition to the ID part described above, fields denoted by Gap, VFO3, Sync, Data Field, PA and Buffer, and the number of bytes of each of these fields is indicated in correspondence with these fields. Furthermore, in FIG. 13C, the sector includes, in addition to the ID part described above, fields denoted by Gap, VFO3, Sync, Data Field, PA and Buffer, and the number of bytes of each of these fields is indicated in correspondence with these fields.

In this Specific Example 2, the number of bytes of the control track 202 is approximately 2 (N=2) times the number of bytes of the data track 201 based on the recording frequency of the data part 206 of the data track 201. Except for the fact that the storage capacity is approximately 2 times that of the optical disk having the diameter of 90 mm, the storage capacity of 640 MB and in conformance with the ISO/IEC15041, the optical disk 72 is basically in conformance with the ISO/IEC15041.

Specific Example 3 of the Format

In order to achieve a memory capacity of 2.0 GB which is approximately 3 times the memory capacity of 640 MB using the above described optical disk having the diameter of 90 mm, the memory capacity of 640 MB and in conformance with the ISO/IEC15041, it is necessary to set the minimum mark length to 0.21 μm. In the data part 206 of the data track 201 on the optical disk 72, it is possible to realize a minimum mark length of 0.21 μm utilizing the MSR. But in the ID part 205 of the data track 201 and the ID part 205 and the data part 206 of the control track 202, it becomes impossible to reproduce the information if the minimum mark length is set to 0.21 μm. Hence, the minimum mark length is set to 0.64 μm as in the conventional case in the ID part 205 of the data track 201 and the ID part 205 and the data part 206 of the control track 202. The ratio with respect to the entire storage capacity of the optical disk 72 occupied by the ID part 205 of the data track 201 and the control track 202 is small, and thus, the storage capacity of the optical disk 72 as a whole will not be greatly reduced by such an arrangement. The track format for this case is shown in FIGS. 14A and 14B, and the sector format for this case is shown in FIGS. 15A, 15B and 15C. In FIGS. 15A through 15C, those parts which are the same as those corresponding parts in FIGS. 9A and 9B are designated by the same reference numerals.

FIG. 14A shows the format of the control track, and FIG. 14B shows the format of the data track. In addition, FIG. 15A shows the structure of a 189-byte ID part, FIG. 15B shows the structure of a 7893-byte sector on the control track 202, and FIG. 15C shows the structure of a 2694-byte sector on the data track 201. In FIG. 15A, the ID part includes a sector mark SM, a VFO1 field, an address mark AM, an ID1 field, a VFO2 field, an address mark AM, an ID2 field, and a postamble PA, and the number of bytes of each of these portions is indicated in correspondence with these portions. On the other hand, in FIG. 15B, the sector includes, in addition to the ID part described above, fields denoted by Gap, VFO3, Sync, Data Field, PA and Buffer, and the number of bytes of each of these fields is indicated in correspondence with these fields. Furthermore, in FIG. 15C, the sector includes, in addition to the ID part described above, fields denoted by Gap, VFO3, Sync, Data Field, PA and Buffer, and the number of bytes of each of these fields is indicated in correspondence with these fields.

In this Specific Example 3, the number of bytes of the control track 202 is approximately 3 (N=3) times the number of bytes of the data track 201 based on the recording frequency of the data part 206 of the data track 201. Except for the fact that the storage capacity is approximately 3 times that of the optical disk having the diameter of 90 mm, the storage capacity of 640 MB and in conformance with the ISO/IEC15041, the optical disk 72 is basically in conformance with the ISO/IEC15041.

Specific Example 4 of the Format

In order to achieve a memory capacity of 2.0 GB which is approximately 3 times the memory capacity of 640 MB using the above described optical disk having the diameter of 90 mm, the memory capacity of 640 MB and in conformance with the ISO/IEC15041, it is necessary to set the minimum mark length to 0.21 μm. In the data part 206 of the data track 201 on the optical disk 72, it is possible to realize a minimum mark length of 0.21 μm utilizing the MSR. But in the ID part 205 of the data track 201 and the ID part 205 and the data part 206 of the control track 202, it becomes impossible to reproduce the information if the minimum mark length is set to 0.21 μm. Hence, the minimum mark length is set to 0.64 μm as in the conventional case in the ID part 205 of the data track 201 and the ID part 205 and the data part 206 of the control track 202. The ratio with respect to the entire storage capacity of the optical disk 72 occupied by the ID part 205 of the data track 201 and the control track 202 is small, and thus, the storage capacity of the optical disk 72 as a whole will not be greatly reduced by such an arrangement. The track format for this case is shown in FIGS. 16A and 16B, and the sector format for this case is shown in FIGS. 17A, 17B and 17C. In FIGS. 17A through 17C, those parts which are the same as those corresponding parts in FIGS. 9A and 9B are designated by the same reference numerals.

FIG. 16A shows the format of the control track, and FIG. 16B shows the format of the data track. In addition, FIG. 17A shows the structure of a 189-byte ID part, FIG. 17B shows the structure of a 8082-byte sector on the control track 202, and FIG. 17C shows the structure of a 2694-byte sector on the data track 201. In FIG. 17A, the ID part includes a sector mark SM, a VFO1 field, an address mark AM, an ID1 field, a VFO2 field, an address mark AM, an ID2 field, and a postamble PA, and the number of bytes of each of these portions is indicated in correspondence with these portions. On the other hand, in FIG. 17B, the sector includes, in addition to the ID part described above, fields denoted by Gap, VFO3, Sync, Data Field, PA and Buffer, and the number of bytes of each of these fields is indicated in correspondence with these fields. Furthermore, in FIG. 17C, the . sector includes, in addition to the ID part described above, fields denoted by Gap, VFO3, Sync, Data Field, PA and Buffer, and the number of bytes of each of these fields is indicated in correspondence with these fields.

In this Specific Example 4, the number of bytes of the control track 202 is approximately 3 (N=3) times the number of bytes of the data track 201 based on the recording frequency of the data part 206 of the data track 201. Except for the fact that the storage capacity is approximately 3 times that of the optical disk having the diameter of 90 mm, the storage capacity of 640 MB and in conformance with the ISO/IEC15041, the optical disk 72 is basically in conformance with the ISO/IEC15041.

In the Specific Examples 1 through 4 described above, the recording density is improved by setting the mark length to ½, 1/3, . . . , based on the optical disk having the diameter of 90 mm, the storage capacity of 640 MB and in conformance with the ISO/IEC15041. However, it is also possible to realize an optical disk having a storage capacity of 1.3 GB by reducing the track pitch from 1.1 μm to 0.9 μm and reducing the mark length from 0.64 μm to 0.38 μm, for example. In this case, the sector format may be the same as that shown in FIGS. 13A through 13C.

In the present invention, even when the read/write clock frequency for the ID part (control track) is switched to 1/N (for example, 1/2, 1/3, 1/4, 1/5, . . . ) times the read/write clock frequency for the data part (data track), it is possible to increase the data storage capacity of the optical recording medium without deteriorating the read accuracy of the concavo-convex parts (embossed pits) of the ID part (control track).

In the embodiments described above, the present invention is applied to the magneto-optical disk. However, the application of the present invention is not limited to the magneto-optical disk, and the present invention is similarly applicable to various kinds of recording mediums including optical disks such as a phase change type optical disk and a card shaped recording medium, as long as the recording medium is provided with a first region which is recorded with first information in the form of the concavo-convex shape and a second region which is recorded with second information by an optical means.

Further, the present invention is not limited to these embodiments, but various variations and modifications may be made without departing from the scope of the present invention.

What is claimed is:

1. A storage unit for optically reproducing information from an optical recording medium of a type having a control track and a data track said control track and said data track having mutually different recording densities, said storage unit comprising: reproducing means for reproducing information from the optical recording medium;

control means for switching a frequency of a read clock which is used when reproducing the control information and data from the optical recording medium depending on whether the control information is reproduced from the control track or the data is reproduced from the data track;

wherein said control track includes a first data part prerecorded with control information having medium information peculiar to the optical disk using embossed pits, and a first identification part for identifying a recording track of said first data part using embossed pits; and said data track includes a second data part recorded with the data recorded by an optical means, and a second identification part for identifying the recording track of said data part of said data track using embossed pits.

2. The storage unit as claimed in claim 1, wherein the recording density of the control track is 1/N times the recording density of the data recorded in the data track, where N>1.

3. The storage unit as claimed in claim 2, wherein N is an integer greater than or equal to 2.

4. The storage unit as claimed in claim 1, wherein said control means switches the frequency of the read clock when reproducing the control information from the control track to 1/N times the frequency of the read clock at a time of reproducing the data from the data track, where N>1.

5. The storage unit as claimed in claim 4, wherein N is an integer greater than or equal to 2.

6. The storage unit as claimed in claim 1, wherein said control means controls the frequency of the read clock to be identical when reproducing the data part of the control track and when reproducing the identification part of the control track.

7. The storage unit as claimed in claim 6, wherein said control means controls the frequency of the read clock to be different when reproducing the data part of the data track and the identification part of the data track.

8. The storage unit as claimed in claim 1, wherein the optical recording medium comprises a substrate, a recording layer provided on the substrate and recorded with the data with a recording density smaller than a diameter of a light beam used, and a reproducing layer to which the data recorded in the recording layer is transferred at a time of reproduction.

9. The storage unit as claimed in claim 1, which further comprises:

a first generator which generates a reference clock; and a second generator which generates first and second clocks based on the reference clock, said control means switching the frequency of the read clock to a frequency of the first clock when reproducing the control information from the control track, and to a frequency of the second clock when reproducing the data from the data track.

10. The storage unit as claimed in claim 9, wherein the frequency of the first clock is 1/N times the frequency of the second clock, where N>1.

11. An optical recording medium comprising:

a control track including a first data part prerecorded with control information having medium information peculiar to the optical disk using embossed pits, and a first identification part for identifying a recording track of said first data part using embossed pits; and a data track including a second data part recorded with data by an optical means, and a second identification part for identifying the recording track of said data part of said data track using embossed pits;

wherein said control track having a recording density which is 1/N times a recording density of the data recorded in said second data part of said data track, where N>1;

said second identification part of the data track having a recording density which is 1/N times a recording density of said second data part of said data track, where N>1.

12. The optical recording medium as claimed in claim 11, which further comprises:

a substrate;

a recording layer, provided on the substrate, and recording the data with a recording density smaller than a diameter of a light beam used; and a reproducing layer to which the data recorded in the recording layer is transferred at a time of reproduction.

13. The optical recording medium as claimed in claim 11, wherein N is an integer greater than or equal to 2.

14. An optical recording medium comprising:

a control track including a first data part prerecorded with control information having medium information peculiar to the optical disk using embossed pits, and a first identification part for identifying a recording track of said first data part using embossed pits; and a data track including a second data part recorded with data by an optical means, and a second identification part for identifying the recording track of said second data part of said data track using embossed pits;

wherein said second data part of said data track has a different recording density from said control track and said second identification part of said data track.

\* \* \* \* \*

UNITED STATES PATENT AND TRADEMARK OFFICE
CERTIFICATE OF CORRECTION

PATENT NO. : 6,449,231 B1
DATED : September 10, 2002
INVENTOR(S) : Numata

It is certified that error appears in the above-identified patent and that said Letters Patent is hereby corrected as shown below:

Title page,
Item [56], FOREIGN PATENT DOCUMENTS, "EP 571986", delete "12/1983" and insert -- 12/1993 --.

Column 16,
Line 8, insert -- , -- (a comma) before "said control track".

Signed and Sealed this

Twenty-seventh Day of May, 2003

JAMES E. ROGAN
*Director of the United States Patent and Trademark Office*